United States Patent [19]

Searle et al.

[11] Patent Number: 4,919,213
[45] Date of Patent: Apr. 24, 1990

[54] GARDEN ROLLER TOOL WITH ADJUSTABLE TELESCOPIC ARMS

[76] Inventors: William M. Searle, Box 67 Rte. 1, Edwards, Ill. 61528; George Spector, 233 Broadway Rm. 3615, New York, N.Y. 10007

[21] Appl. No.: 821,752

[22] Filed: Jan. 23, 1986

[51] Int. Cl.⁵ .................................................. A01B 1/20
[52] U.S. Cl. .................................. 172/350; 56/400.04; 172/372; 172/375; 172/378; 172/611
[58] Field of Search ............... 172/349, 350, 371, 372, 172/375, 373, 374, 378, 381, 611; 56/400.04, 400.05, 400.06, 400.07, 400.13, 400.14; D8/6, 7, 8, 11

[56] References Cited

U.S. PATENT DOCUMENTS

| | | | |
|---|---|---|---|
| 534,279 | 2/1895 | North | 172/349 X |
| 563,281 | 7/1896 | Kuehl | 56/400.04 |
| 719,723 | 2/1903 | Beebe | 172/378 X |
| 1,207,308 | 12/1916 | McCoy | 172/381 X |
| 1,374,740 | 4/1921 | Jarvis | 172/372 |
| 1,528,843 | 3/1925 | Olesen | 172/375 |
| 1,728,331 | 9/1929 | Christianson | 56/400.13 |
| 1,849,451 | 3/1932 | Erlanger | 172/611 X |
| 2,225,108 | 12/1940 | Glascock | 172/375 X |
| 3,062,300 | 11/1962 | Bullard | 172/349 X |
| 4,037,668 | 7/1977 | Svejda | 172/371 |
| 4,169,509 | 10/1979 | Lowman | 172/375 |
| 4,174,003 | 11/1979 | Zepeda | 172/375 |

FOREIGN PATENT DOCUMENTS 1056862 5/1959 Fed. Rep. of Germany ...... 172/381

Primary Examiner—Richard T. Stouffer

[57] ABSTRACT

A garden roller tool is provided having a weighted roller journaled on fork end of a ferrule at proximal end of an elongated handle. In one position the handle is tilted downwardly with the roller elevated applying pressure on an implement of the tool pushing the implement into the ground. In another position the handle is raised upwardly with roller lowered releasing pressure on the implement of the tool, raising the implement from the ground, allowing the roller to roll over the ground.

1 Claim, 1 Drawing Sheet

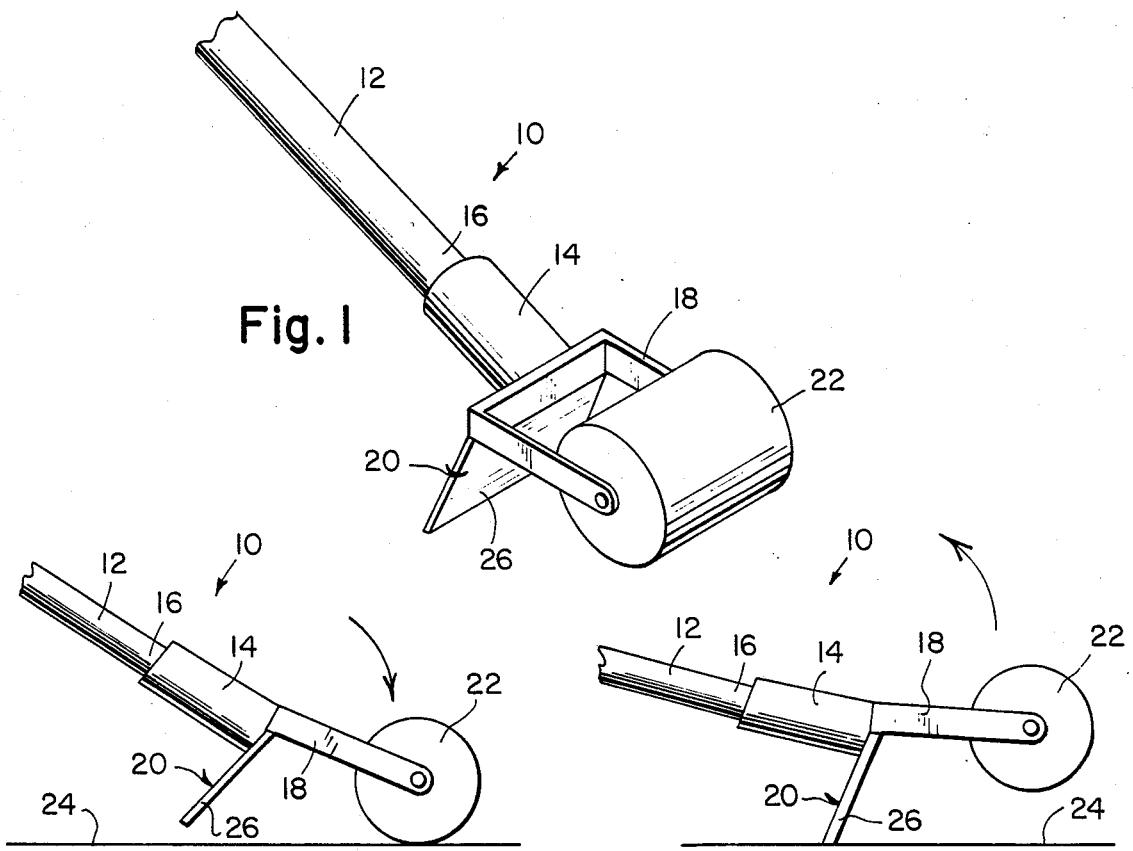
Fig. 1
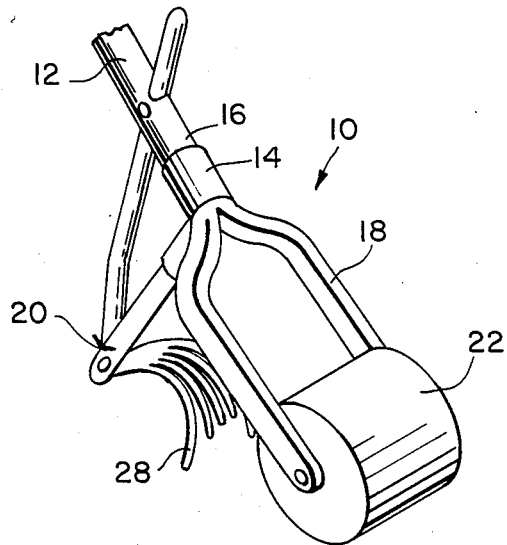
Fig. 2
Fig. 3
Fig. 4
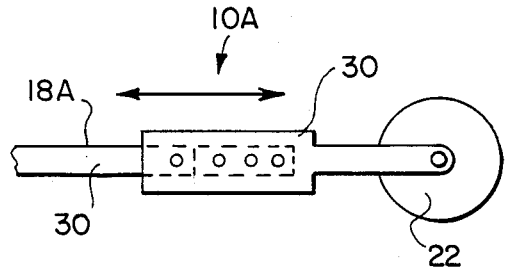
Fig. 5

GARDEN ROLLER TOOL WITH ADJUSTABLE TELESCOPIC ARMS

BACKGROUND OF THE INVENTION

The instant invention relates generally to cultivator tools and more specifically it relates to a garden roller tool.

Numerous cultivator tools have been provided in prior art that are adapted to have relatively large diameter single wheel attached to a frame with rearwardly extending handles so that the cultivator tools can be hand propelled. For example, U.S. Pat. Nos. 2,591,420; 2,645,990 and 4,168,749 all are illustrative of such prior art. While these units may be suitable for the particular purpose to which they address, they would not be as suitable for the purposes of the present invention as heretofore described.

SUMMARY OF THE INVENTION

A principle object of the present invention is to provide a garden roller tool that will overcome the shortcomings of the prior art devices.

Another object is to provide a garden roller tool whereby raising and lowering of a weighted roller will properly control pressure of an implement against the ground when operated by a user.

An additional object is to provide a garden roller tool that is adjusted by the extension of telescopic arms to the weighted roller such that the height position of the roller is increased when pivotly lifted upwards from the ground applying more pressure on the implement.

A further object is to provide a garden roller tool that is simple and easy to use.

A still further object is to provide a garden roller tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention being a garden roller tool having a hose implement thereon.

FIG. 2 is a side view of the invention shown in FIG. 1 with the handle raised with the hoe implement up and weighted roller down on the ground.

FIG. 3 is a side view similar to FIG. 2 with the handle lowered with the hoe implement down into the ground and the weighted roller up.

FIG. 4 is a perspective view of the invention being a garden roller tool having a plow implement thereon.

FIG. 5 is a partial side view of a modification shwoing one of two telescopic arms to increase the pressure of the weighted roller when the roller is up.

DETAILED DESCRIPTION OF THE PREFERRED EMBODIMENTS

Turning now descriptively to the drawings, in which similar reference characters denote similar elements throughout the several views, FIGS. 1 through 4 illustrate a garden roller tool 10 which contains an elongated handle 12, a ferrule 14 affixed to proximal end 16 of the handle. The ferrule 14 has a forked end 18 and a generally transverse implement 20 extending therefrom.

A weighted roller 22 is journaled on the forked end 18 of the ferrule 14. In one position (see FIG. 3) when the handle 12 is tilted downwardly the roller 22 is elevated applying pressure on the implement 20 to push the implement into the ground 24. In another position (see FIG. 2) when the handle 12 is raised upwardly the roller 22 is lowered releasing pressure on the implement 20, raising the implement from the ground 24 thus allowing the roller 22 to roll over the ground.

The implement 20 on the ferrule 14 can be a hoe 26 as shown in FIGS. 1 through 3 or a plow 28 as shown in FIG. 4.

FIG. 5 shows a modified garden roller tool 10A wherein the forked end 18A of the ferrule includes a pair of adjustable telescopic arms 30 with the weighted roller 22 journaled thereto. Only one arm 30 is illustrated and is constructed to be placed into any length desired and locked. The extension of the telescopic arms 30 will increase height of the roller 22 when the roller is lifted upwardly from the ground 24 thus applying more pressure on the implement 20.

The garden roller tool 10 or 10A could be used as a piece of farm equipment, if made between ten to fourteen feet wide and pulled behind a tractor and operated by the power lift. It can be used as a roller plow, a roller alone or as a plow alone.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A garden roller tool which comprises:
    (a) an elongated handle having inner and outer ends;
    (b) a ferrule affixed longitudinally to the outer end, said ferrule having a forked end and a generally transverse implement extending therefrom between said forked end and said outer end of said handle;
    (c) a weighted roller journaled on said forked end of said ferrule outward of said implement so that in one position when said handle is tilted downwardly, said roller is elevated applying pressure on said implement as a fulcrum to push said implement into the ground and in another position when said handle is raised upwardly said roller is lowered to engage the ground, releasing pressure on said implement, whereby said roller acts as a fulcrum in raising said implement from the ground allowing said roller to roll over the ground freely, wherein said forked end of said ferrule includes a pair of adjustable telescopic arms with said weighted roller journaled thereto so that movement of said telescopic arms will vary the distance of said roller from said implement so that when said roller is lifted upwardly from the ground the pressure applied to said implement will vary.

* * * * *